United States Patent [19]

Hoogenboom et al.

[11] Patent Number: 4,694,160

[45] Date of Patent: Sep. 15, 1987

[54] FIBER OPTIC EXTENDER APPARATUS IN A POSITION SERVO LOOP

[75] Inventors: Leo Hoogenboom, Ballston Lake; Curtis D. Kissinger, Gloversville, both of N.Y.

[73] Assignee: Mechanical Technology Incorporated, Latham, N.Y.

[21] Appl. No.: 823,671

[22] Filed: Jan. 29, 1986

[51] Int. Cl.⁴ .................................... G01J 1/20
[52] U.S. Cl. ..................... 250/227; 250/201
[58] Field of Search .............. 250/227, 204, 201 R, 250/201 PF, 201 AF, 231 R, 231 P; 73/705; 356/4

[56] References Cited

U.S. PATENT DOCUMENTS

| 3,503,116 | 3/1970 | Strack | 73/705 |
| 4,070,116 | 1/1978 | Frosch et al. | 250/201 |
| 4,163,148 | 7/1979 | Fritsche et al. | 250/201 PF |
| 4,492,860 | 1/1985 | Brogardh et al. | 250/227 |

Primary Examiner—Edward P. Westin
Assistant Examiner—Charles Wieland
Attorney, Agent, or Firm—Joseph V. Claeys; Joseph C. Sullivan

[57] ABSTRACT

A proximity sensor is disclosed having two bifurcate fiber optical bundles arranged in series. Light is directed at a target by the bundles and the reflected light from the target is transmitted to two different sensors. The output of the sensors is used to derive a differential control signal for tracking a target. One of the sensors picks up reflected light from the fibers which also transmit light to the target while the second sensor detects light from receiver fibers disposed around said transmitter fibers.

10 Claims, 9 Drawing Figures

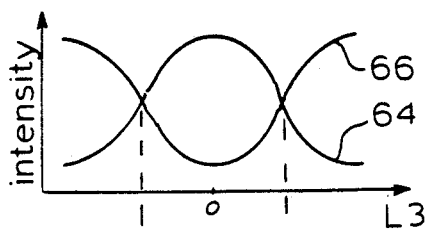
FIG.3
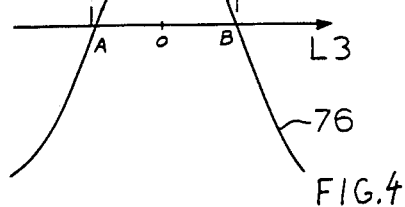
FIG.4
f = 2
FRONT FACE 50
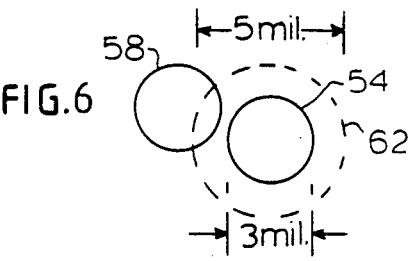
FIG.6
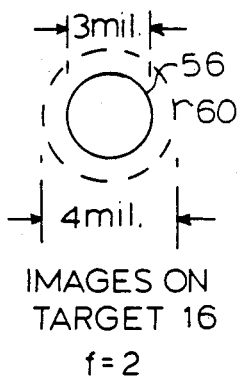
FIG.5
IMAGES ON
TARGET 16
f = 2
FIG.2
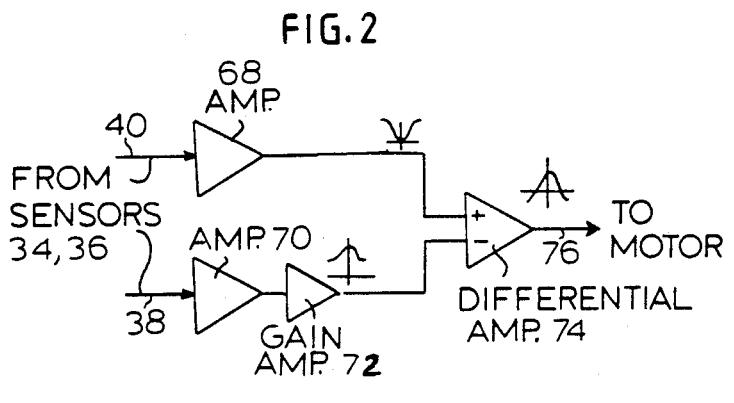
MOTOR CONTROL CKT. 42
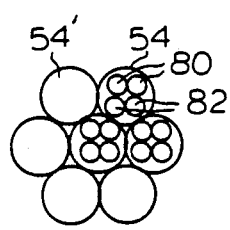
FIG.9
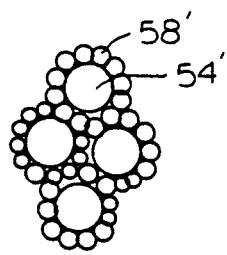
FIG.8

FIBER OPTIC EXTENDER APPARATUS IN A POSITION SERVO LOOP

BACKGROUND OF THE INVENTION a. Field of Invention

This invention relates to an optical proximity sensor having two bifurcated optical bundles used in a servo loop.

b. Description of the Prior Art

Bifurcated optical fibers are frequently used in sensors to detect a distance to a target. Typically, one sensor bundle comprises two sets of fibers, each set originating from a respective arm, the two sets being joined in a common leg. Light is transmitted from a light source through one arm to the target and the corresponding light reflected from the target is conducted by the other arm to a light sensor. The intensity of the reflected light is indicative of the distance between the end of the common leg and the target. However, a direct measurement of the intensity has proven to be an unreliable parameter because of long and short term variations in the intensity of the light source, and variations in the reflectivity of the target. As, for example, when a target is scanned in a profile measurement. Numerous schemes have been devised in the past to overcome these problems. However, these schemes proved to be unreliable and/or very expensive to implement.

Therefore there is a present need for an optical sensor capable of indicating a distance to a target which yields reliable, consistent and accurate results and is inexpensive to make.

SUMMARY OF THE INVENTION

In accordance with the present invention, an optical proximity sensor comprises an optical head movably disposed with respect to a target and two bifurcate optical fiber bundles arranged in series to direct light from a source to the target and to detect the corresponding reflected light from the target. Two light detectors are also provided to generate sensor signals corresponding to the reflected light picked up by the bundles. The bundles and sensors are arranged so that one of the sensors detects the light reflected into the transmitter fibers of one of the bundles while the second detector senses the light reflected into the receiver fibers arranged around the transmitter fibers. The signals from the two signals are fed into a differential amplifier to obtain a control signal with two null points. The control signal is used in a servo loop to maintain the head at one of the null points.

BRIEF DESCRIPTION OF THE DRAWINGS

FIG. 2 shows details of a motor control circuit of the sensor of FIG. 1;

FIG. 3 shows the input signals to the circuit of FIG. 2;

FIG. 4 shows the output of the circuit of FIG. 2;

FIG. 5 shows the images produced on the target by the sensor of FIG. 1;

FIG. 6 shows the images reflected by the target of FIG. 1;

FIG. 8 shows a cross-sectional view taken along line 8—8 of FIG. 7; and

FIG. 9 shows a cross-sectional view taken along line 9—9 of FIG. 7.

DETAILED DESCRIPTION OF THE INVENTION

Figure 1:
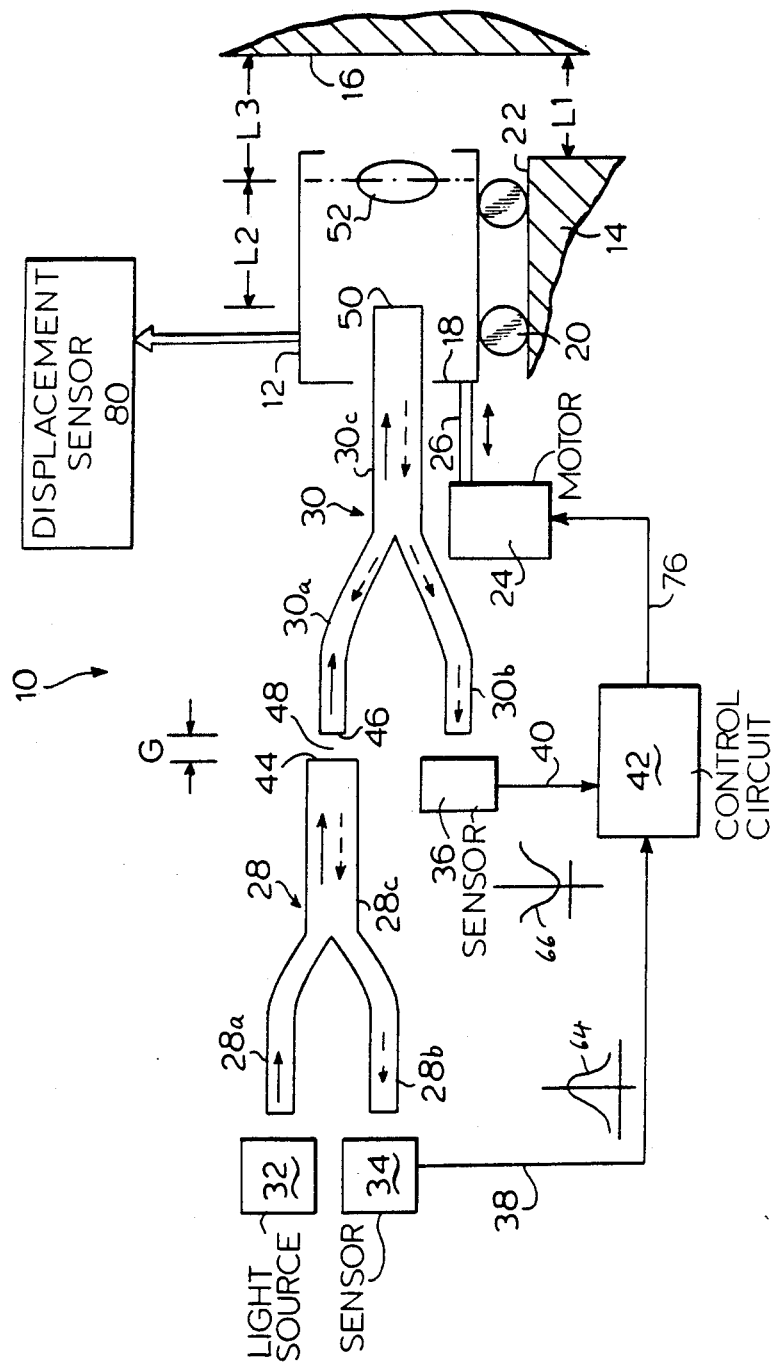
FIG. 1 shows, in a somewhat schematic form, the elements of a fiber optic proximity sensor constructed in accordance with the present invention.

Referring now to FIG. 1, a fiber optic proximity sensor 10, according to this invention, comprises a sensor head 12 which is movable with respect to a platform 14 to track a target 16. More particularly, the sensor is provided with a servo control loop for maintaining the head at a preselected constant distance from target 16. While, as the target is moved past the sensor the distance between the target 16 and platform 14 will vary due to target topography, the servo control loop acts on carriage 18 to move it towards or away from target 16 so as to maintain a substantially constant distance L3 between the target 16 and lens 52.

Preferably, sensor head 12 includes a carriage 18 which rides on suitable bearing means 20 as shown over a top surface 22 of platform 14. A motor 24 drives carriage 18 through a coupling 26 to move carriage 18 toward or away from target 16. Coupling 26 may comprise, a rod, linearly reciprocated by the motor, a gear rotated by motor 24 and cooperating with a nut (not shown) affixed to the carriage, or other coupling elements well known in the art. Alternatively, motor 24 may be a linear motor with a faster response than a rotary motor.

The sensor 10 also comprises two bifurcated fiber optic bundles 28 and 30. Bundle 28 is formed with two arms 28a, 28b, each composed of a plurality of optical fibers. The fibers of the two arms are joined together to form leg 28c. Similarly, bundle 30 has leg 30c having optical fibers which are partitioned to form legs 30a and 30b.

For the sake of convenience the fibers making up arms 28a and 30a shall be called transmitter fibers to indicate that their primary function is to transmit light to the target 16. Similarly, the fibers of arms 28b and 30b shall be called the receiver fibers, it being understood that all of these fibers do in fact carry light in both directions.

The sensor also includes a light source 32 coupled to arm 28a, a first light sensor 34 coupled to arm 28b and a second light sensor 36 coupled to arm 30b. The outputs 38, 40 of the two light sensors 34, 36 are sent to a motor control circuit 42 which controls the motor 24, thereby completing the servo loop.

Bundle 28 has a front face 44 which is disposed in parallel with, and spaced away from a rear face 46 provided on arm 30a. The gap between faces 46 and 48 is identified by numeral 48. Bundle 30 also has an end with a front face 50 which is generally in parallel with target 16 as shown. Between front face 50 and target 16 there is an imaging means, shown as a lens 52. A front portion of leg 30c and the lens 52 are joined together at a fixed distance L2 and are attached to carriage 18.

The operation of the sensor shall now be described in conjunction with the figures. Light from source 32 propagates through arm 28a and leg 28c and exits from front face 44 towards the rear face 46 of bundle 30. (The path of the light from the source 32 to the target is indicated in FIG. 1 by the solid arrows. The path of the light reflected by the target are indicated by broken arrows.) Light from rear face 46 propagates through arm 30a and leg 30c so that as viewed at face 50 the transmit fibers appear as bright circles. The image of face 50 is projected by lens 52 onto target 16.

Light reflected by the target 16 is projected back by lens 52 on face 50 and it propagages through both the transmitter fibers of arm 30a and the receiver fibers of arm 30b. From arm 30a the reflected light is dispersed by the gap 48 and picked up by bundle 28. Gap 48 functions as a beam splitter and mixer thereby insuring an even distribution of light returned through 30a across the fibers of 28c. The reflected light thus propagates through leg 28c, and arm 28a towards the source (where it is lost) and through arm 28b to sensor 34.

Reflected light picked up by the receiver fibers of bundle 30 passes through leg 30b and is transmitted to sensor 36. Sensors 34 and 36 generate sensor signals proportional to the reflected light from arms 28b and 30b respectively, which sensor signals are sent to control circuit 42.

As previously mentioned the distance L3 between lens 52 and target 16 is variable due to the topography of target 16 as it is scanned, and the purpose of the present invention is to move carriage 12 and lens 52 to maintain L3 constant. Lens 52 preferably has a unity magnification so that L2 is equal at least approximately to L3 and (when the lens is properly focused) the images on the target and face 50 are identical. For example, as shown in FIGS. 5 and 6, a circular transmitter fiber 54 with a diameter of 3 mils, produces a corresponding image 56 on target 16 which is also 3 mils in diameter. The image of circle 56 is projected back on face 50 and coincides with the end face 54 of the fiber. As a result, virtually all the reflected light is picked up by the transmitter fibers and there is no reflected light entering the receiver fibers of bundle 30. A portion of the reflected light is sensed by sensor 34. On the other hand almost no light enters an adjacent receiver fiber 58 of bundle 30 and therefore the output of sensor 36 is very low.

If lens 52 has an optical opening of F=2 and the distance L3 is increased or decreased by a small amount, for example by ±4 mils, the image on the target increases to 4 mils as indicated by numeral 60 in FIG. 5. This image is reflected back onto surface 50 by lens 52 as a circle 62 having a diameter of 5 mils. As a result, the reflected light is redistributed so that a lesser portion enters the receiver fiber 54 and a greater portion enters transmitter fiber 58 than when the image is focused. Thus as the head 12 moves toward or away from the target from the focus point, the amplitude 64 of sensor signal 38 decreases from a maximum as shown on FIG. 3, with the point 0 indicating the focus point. Conversely, the amplitude 66 of sensor signal 40 is at a minimum at point 0 and it increases as head 12 moves toward or away from the target 16.

As shown in FIG. 2, the signals from sensors 34 and 36 are boosted by amplifiers 68 and 70. Of the light received by fiber 54 in FIG. 6, some is lost when it passes across gap 48 on its way to sensor 34. To compensate for this loss an additional gain amplifier 72 is provided to bring the signal from sensor 4 to the level of the signal from sensor 36.

The outputs of amplifiers 72 and 68 are fed to a differential amplifier 74 which generates an output signal 76 which, as shown in FIG. 4, is proportional to the difference between 64 and 66. While head 12 is moved away from point 0 in either direction two points A and B are reached, symmetrically disposed around point 0, at which the two signals 64 and 66 (after amplification) are equal. Thus, at points A and B the signal 76 crosses the horizontal axis. One of these points is used in the present invention to track target 16 by using the output 76 of amplifier 74 to drive motor 24. Initially the carriage 12 is positioned at one of the points such as point B so that the output of the amplifier is zero. If the target recedes from the carriage, L3 increases producing a negative voltage level as the output of amplifier 74. This negative voltage causes the motor 24 to move the carriage 12 toward the target until output voltage 76 returns to zero. If the output 76 goes positive, the motor drives the carriage in the opposite direction.

The position of the carriage 12 with respect to platform 14 is thus indicative of the distance L3 to the target and is sensed by a displacement sensor 80.

Figure 7:
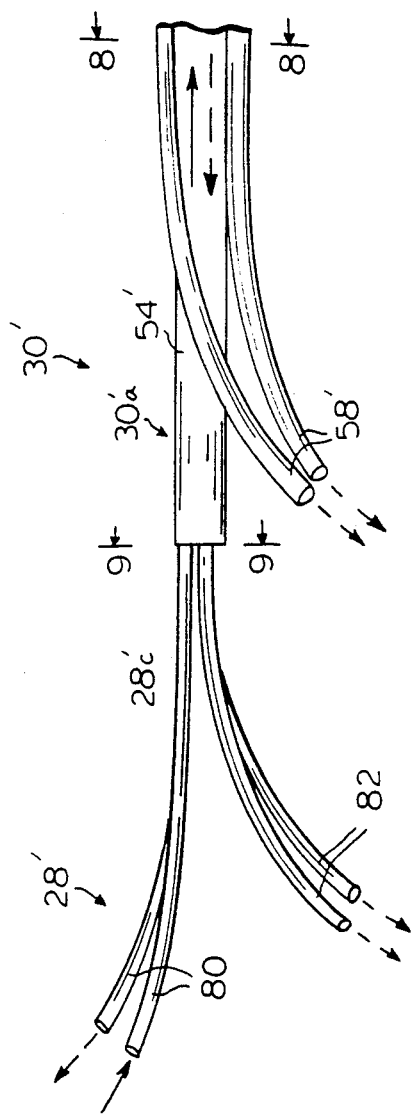
FIG. 7 shows an alternate embodiment of the invention.

In FIG. 6, the transmitter fiber 54 is shown as being substantially equal in diameter to the receiver fiber 58. An alternate configuration is shown in FIGS. 7, 8 and 9. In this configuration, bundle 30 comprises transmit fibers 54 (only one is shown in the FIG. 7 for the sake of clarity) which are much larger in diameter than receiver fibers 58. As a result, a plurality of receiver fibers 58 may be clustered around each transmitter fiber as shown in FIG. 8 to pick up the light reflected from the target more efficiently. For example the receiver fibers 58 may have a diameter of about 0.001 inches.

Furthermore, when bundles 28 and 30 are identical, gap 48 is required as a diffuser. However, as shown in FIGS. 7 and 9 a different bundle 28' may be used in which both the transmitter fibers 80 and receiver fibers are smaller than the transmitter fibers 54 of bundle 30. Therefore the leg 28'c of bundle 128' may abut arm 30'a without a diffuser gap.

Obviously numerous modifications may be made to the invention without departing from the scope of the invention as defined in the appended claims.

We claim:

1. A proximity sensor for determining the distance between a fixed reference and a target comprising:
   a light sensor;
   first and second bifurcate bundles of optical fibers;
   imaging means positioned between said first and second bifurcate bundles and said target;
   first and second light detectors for generating first and second sensor signals corresponding to the light intensities detected by the detectors; said first and second bundles being positioned and arranged to direct light from said light source to said target through said imaging means and to transmit reflected light from said target to the first and second sensors respectively for generating two corresponding sensor signals, said sensor signals having a maximum and a minimum intensity respectively when one of said bundles is at a preselected distance from the target;
   means for generating a control signal corresponding to the difference between said first and second detector signals;
   movable means attached to said one bundle; and
   means for moving said attached movable means and thus said one bundle in accordance with said control signal for tracking said target.

2. A proximity sensor for tracing a target comprising:
   a light source;
   a fixed reference;
   first and second light detectors for generating first and second detector signals respectively corresponding to light detected by the detectors;

a first bundle of optical fibers having a first arm with first transmitter fibers for receiving light from said light source, a second arm with first receiver fibers for transmitting light to said first detector, and a first leg including the fibers of said first and second arm;

imaging means positioned between said first bundle and said target, a second bundle of optical fibers having a first arm with second transmitting fibers for transmitting light from said light source to said first arm of said first bundle; a second arm with second receiver fibers for transmitting light to said second detector, and a second leg including extensions of the fibers of said first and second arm, said second leg being arranged to direct light from said light source to said target through said imaging means, and to receive reflected light from said target;

control means for generating a control signal proportional to a difference between said first and second detector signals;

movable means attached to said second leg with respect to said fixed reference and means for moving said attached movable means and thus said second leg with respect to said reference in accordance with said control signal to minimize said difference.

3. The sensor of claim 2 wherein said fixed reference includes a platform, said sensor further comprising a carriage movable on said platform, said carriage supporting at least a portion of said second leg.

4. The sensor of claim 3 wherein said imaging means comprises a lens disposed on said carriage at a preselected distance from said second leg and between said second leg and the target.

5. The sensor of claim 3 wherein said control means includes a differential amplifier having said first and second signals as its input signals.

6. The sensor of claim 5 wherein said control means includes a gain amplifier for boosting the second signal.

7. The sensor of claim 2 wherein said first leg separated from the first arm of the second bundle by a light-dispersing gap.

8. The sensor of claim 2 wherein the second transmitter fibers have a larger diameter than the second receiver fibers.

9. The sensor of claim 8 wherein the first receiver and transmitter fibers have a smaller diameter than the second transmitter fibers.

10. The sensor of claim 2 wherein said first sensor detects reflected light from said second transmitter fibers and said second detector detects light from said second receiver fibers, said second receiver fibers being arranged around said second transmitter fibers.

* * * * *

UNITED STATES PATENT AND TRADEMARK OFFICE
CERTIFICATE OF CORRECTION

PATENT NO. : 4,694,160
DATED : September 15, 1987
INVENTOR(S) : Leo Hoogenboom
Curtis D. Kissinger It is certified that error appears in the above-identified patent and that said Letters Patent are hereby corrected as shown below:

Column 2, line 65, change "path" to --paths--;

Column 3, line 60, change "4" to --34--.

Signed and Sealed this

Fifth Day of January, 1988

Attest:

DONALD J. QUIGG

*Attesting Officer*  *Commissioner of Patents and Trademarks*